United States Patent
Chen (10) Patent No.: US 10,690,287 B2
(45) Date of Patent: Jun. 23, 2020

(54) FRAMEWORK FOR INSTALLATION OF COUPLING COMPONENTS

(71) Applicant: Xiaoming Chen, Richmond Hill (CA)

(72) Inventor: Xiaoming Chen, Richmond Hill (CA)

(73) Assignee: Xiaoming Chen, Richmond Hill, Ontario (CA)

( * ) Notice: Subject to any disclaimer, the term of this patent is extended or adjusted under 35 U.S.C. 154(b) by 0 days.

(21) Appl. No.: 16/198,376

(22) Filed: Nov. 21, 2018

(65) Prior Publication Data

US 2019/0186688 A1 Jun. 20, 2019

Related U.S. Application Data

(63) Continuation of application No. 15/957,334, filed on Apr. 19, 2018, now Pat. No. 10,371,317.

(30) Foreign Application Priority Data

Nov. 24, 2017 (CN) ..................... 2017 2 1602343 U
Nov. 24, 2017 (CN) ..................... 2017 2 1602631 U (51) Int. Cl.
*F16M 13/02* (2006.01)
*F16B 2/18* (2006.01)
*F16M 11/04* (2006.01)
*F16M 11/16* (2006.01)
*F16M 11/28* (2006.01)

(52) U.S. Cl.
CPC ............. *F16M 13/022* (2013.01); *F16B 2/18* (2013.01); *F16B 2/185* (2013.01); *F16M 11/041* (2013.01); *F16M 11/043* (2013.01); *F16M 11/16* (2013.01); *F16M 11/28* (2013.01); *F16M 2200/027* (2013.01)

(58) Field of Classification Search
CPC .......... F16M 13/022; F16M 2200/027; F16M 11/041; F16M 11/043; F16M 11/16; F16M 11/28; F16B 2/185
USPC ... 248/357, 177.1, 371, 178.1, 179.1, 184.1, 248/183.4, 317, 323, 324
See application file for complete search history.

(56) References Cited

U.S. PATENT DOCUMENTS 4,437,753 A 3/1984 Dunn
4,525,052 A 6/1985 Kosugi
(Continued)

OTHER PUBLICATIONS

Notice of Allowance issued in U.S. Appl. No. 15/957,334, dated Mar. 20, 2019, 9 pages.
(Continued)

*Primary Examiner* — Muhammad Ijaz
(74) *Attorney, Agent, or Firm* — Arch & Lake LLP (57) ABSTRACT

A framework for installation of coupling components, comprising: at least one mounting rail arranged on at least one of positions above and below the framework and used for installation of coupling components, wherein the mounting rail extends along a length direction of the framework; a locking device arranged at an end portion of the framework; and one or more mounting holes distributed in a side surface of the framework and used for installation of coupling components; wherein the framework is designed as a rectangular frame structure, an inner frame of the framework is provided with a cavity passing through along the length direction thereof, and the mounting hole passes through the cavity.

14 Claims, 13 Drawing Sheets

(56) References Cited

U.S. PATENT DOCUMENTS

| | | | |
|---|---|---|---|
| 4,570,887 A | 2/1986 | Banister | |
| 4,640,481 A | 2/1987 | Kohno | |
| 5,327,791 A * | 7/1994 | Walker | G01G 19/12 |
| | | | 177/211 |
| 5,528,325 A * | 6/1996 | Perez | G03B 15/03 |
| | | | 396/155 |
| 6,244,759 B1 | 6/2001 | Russo | |
| 6,435,738 B1 | 8/2002 | Vogt | |
| 6,773,172 B1 | 8/2004 | Johnson | |
| 7,185,862 B1 | 3/2007 | Yang | |
| 7,559,167 B1 | 7/2009 | Moody | |
| 7,658,556 B2 | 2/2010 | Johnson | |
| 8,091,265 B1 * | 1/2012 | Teetzel | F41C 23/16 |
| | | | 42/124 |
| 8,256,726 B2 | 9/2012 | Bordignon | |
| 8,341,864 B2 | 1/2013 | Moody | |
| 8,393,104 B1 | 3/2013 | Moody | |
| 9,277,794 B2 | 3/2016 | Moreau | |
| 2004/0217240 A1 | 11/2004 | Gordon | |
| 2005/0041966 A1 * | 2/2005 | Johnson | F16M 11/041 |
| | | | 396/428 |
| 2005/0267600 A1 | 12/2005 | Haberman | |
| 2006/0239677 A1 * | 10/2006 | Friedrich | F16M 11/043 |
| | | | 396/419 |
| 2008/0006747 A1 * | 1/2008 | Bobro | F41A 23/10 |
| | | | 248/178.1 |
| 2009/0045304 A1 * | 2/2009 | Faifer | F16M 11/041 |
| | | | 248/188.5 |
| 2010/0084524 A1 * | 4/2010 | Faifer | F16M 11/041 |
| | | | 248/170 |
| 2012/0167434 A1 * | 7/2012 | Masters | F41C 23/16 |
| | | | 42/90 |
| 2013/0058639 A1 | 3/2013 | Galik | |
| 2013/0233988 A1 | 9/2013 | Johnson | |
| 2013/0287386 A1 | 10/2013 | Xu | |
| 2014/0252187 A1 * | 9/2014 | Petrovic | F16B 2/185 |
| | | | 248/229.16 |
| 2017/0261157 A1 | 9/2017 | Guo | |
| 2018/0155920 A1 * | 6/2018 | Ovrum | A63H 33/12 |
| 2018/0259298 A1 | 9/2018 | Gao | |

OTHER PUBLICATIONS

Office Action issued in U.S. Appl. No. 15/957,334, dated Dec. 11, 2018, 8 pages.

Notice of Allowance issued in U.S. Appl. No. 16/198,373, dated Jan. 28, 2020, 8 pages.

Office Action issued in U.S. Appl. No. 16/198,373, dated Nov. 19, 2019, 9 pages.

Office Action issued in U.S. Appl. No. 16/198,373, dated Jun. 12, 2019, 6 pages.

* cited by examiner

FRAMEWORK FOR INSTALLATION OF COUPLING COMPONENTS

CROSS-REFERENCE TO RELATED APPLICATIONS

This application claims the benefit of CN Patent Application No. 201721602631. 6 filed 24 Nov. 2017, and claims the benefit of U.S. patent application Ser. No. 15/957,334 filed 19 Apr. 2018, the entire disclosures of which are hereby incorporated herein by reference.

TECHNICAL FIELD OF THE INVENTION

The present disclosure relates to the field of mechanical connection technology, and more particularly, to a framework for installation of coupling components.

BACKGROUND TECHNOLOGY OF THE INVENTION

At present, photography has become a part of the daily life of more and more people, and the hobby of photography is also constantly subdivided, such as shooting of people, scenery, animal and macro, especially outdoor photography with a Single Lens Reflex (SLR) camera. In order to pursue high-quality photographic image, the technology of SLR camera and lens has developed rapidly in recent years, and the equipment for assisting photography has also changed rapidly, but there are still some shortcomings in outdoor photography as follows.

Firstly, the installation of a telephoto lens in the camera requires the use of assisted equipment to reinforce the connection, and at present, the product provided by the market is single in function and complicated in operation, so that many photography lovers abandon it, and easily causes damage to an interface between the camera and the lens.

Secondly, rapid movement is required when photographing animal outdoors, and the existing equipment is difficult to meet the requirement.

Thirdly, the illumination arrangement of light and focusing are not convenient and stable when performing ecological macro-photography, which increases the difficulty of photography.

In order to adapt to the flexible movement characteristic of outdoor photography, an assisted photography framework of the camera that is quick and easy to assemble and disassemble and has DIY function is needed.

In other mechanical application fields, in order to realize rapid assembly of modules and rapid replacement between the modules, a framework with strong universality, convenient use, and capable of meeting the DIY requirement of free assembly is also needed.

SUMMARY OF THE INVENTION

With respect to above issues, the present disclosure provides a framework for installation of coupling components, which can provide a personalized mounting platform to the user, thereby facilitating rigid connection of assemblies, and the user can mount various module assemblies in a very small space, realize quick disassembly and assembly, and free adjustment, thereby meeting the DIY requirement of free assembly.

According to an aspect, a framework for installation of coupling components includes two mounting rails each of which arranged on top and bottom of the framework respectively, used for installation of coupling components, wherein the mounting rails extends along an axial direction of the framework; a locking device arranged at an end portion of the framework; and one or more mounting holes arranged on a side surface of the framework and used for installation of coupling components; wherein the framework is designed as a rectangular frame structure, an inner frame of the framework is provided with a cavity passing through along the axial direction thereof, and the mounting hole passes through the cavity. Advantageously, the locking device can be a quick locking device, and can be locked with a coupling component provided with a Picatinny Rail or a trapezoid rail.

The present disclosure has the beneficial effects that: according to the present disclosure, the mounting rail is arranged on at least one of positions above and below the framework, and a plurality of mounting holes are arranged on the side surface of the main frame, so that the module assemblies with different functions can be quickly mounted, disassembled and replaced on the framework. The quick locking device is arranged at the axial end portion of the framework, and is locked with the coupling component through the Pictorianny rail or the trapezoid rail arranged on the coupling component, so that, for example, the camera is fixed on the framework, and the connecting rigidity of the camera is effectively increased, and moreover, the quick locking device is combined with the coupling component provided with the Pictorianny rail or the trapezoid rail, so as to easily and quickly adjust and connect the camera with lens holders having different heights and lengths. In addition, the telephoto lens can be fastened to the framework, by a coordination of the quick locking device arranged above the framework and the quick mounting plate having a Pictorianny rail or the trapezoid rail mounted on the quick locking device, so as to rigidly connect the telephoto lens to the framework, and to rigidly connect the camera and the telephoto lens. Moreover, the mounting rail extends along the axial direction of the framework, so that the mounting number of the modules can be increased and the adjustment of the use distance can be facilitated. At least one mounting hole is arranged, and the mounting hole is distributed along the length direction of the framework, so that the user can select to mount the module assembly in the mounting hole according to the requirement and adjust the use distance according to body parameters. According to the design of the framework described in the present disclosure, when the framework is used as a photographic assisted platform, the module assembly matched with the framework is combined for use according to different photographic requirements such as outdoor shooting, macro shooting and the like. The framework of the present disclosure is simple in structure and convenient to use, can give the user a good experience in reflecting personalization and improving photography quality, and is also convenient for the user to mount various module assemblies in a small space, so as to realize quick disassembly and assembly, and free adjustment, and meet the DIY requirement of free assembly. According to various advantageous features and technical effects of the framework of the present disclosure, the framework is also for various application scenarios where the module assembly needs to be mounted.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

Further areas of applicability will become apparent from the description provided herein. It should be understood that the description and specific examples are intended for purposes of illustration only and are not intended to limit the scope of the present disclosure.

DETAILED DESCRIPTION OF THE INVENTION

The following description is merely exemplary in nature and is not intended to limit the present disclosure, application, or uses. The illustrated embodiments are disclosed with reference to the drawings, wherein like numerals indicate corresponding parts throughout the several drawings. The figures are not necessarily to scale and some features may be exaggerated or minimized to show details of particular features. The specific structural and functional details disclosed are not intended to be interpreted as limiting, but as a representative basis for teaching one skilled in the art as to how to practice the disclosed concepts.

The present disclosure is further described in detail hereinafter with reference to the drawings and with the combination of the embodiments. Some assemblies and working principles mentioned below can be mutually common among the embodiments without conflict, and each embodiment exemplarily describes the application of various mechanical connections of the framework according to the present disclosure.

The present disclosure provides a framework assisted photography device for installation of coupling components, which specifically includes a framework for coupling components, a quick locking device, a camera fixing support assembly, a quick mounting plate, a handling assembly, a front support leg assembly, a rear support leg assembly, a camera tripod assembly, a light-source mounting support arm assembly and the like. Compared with the existing photographic assisted equipment in the market, the framework assisted photography device can better meet different photographic requirements of the user and is more convenient and quick to use.

With reference to FIGS. 1 to 4, a framework 1 for installation of coupling components includes at least one mounting rail 2 arranged on at least one of positions above and below the framework 1 and used for installation of coupling components, wherein the positions above and below can be refer to an upper position and a lower position of the framework 1, or can be refer to on top and on bottom of the framework 1, respectively; wherein the mounting rail 2 extends along a length direction of the framework 1; a locking device is arranged at an end portion of the framework 1, provided with a clamping groove 42 and configured to receive and clamp a Picatinny rail or a trapezoid rail provided on the coupling component, in order to lock the coupling component to the framework 1; wherein the locking device is preferably a quick locking device 4 and is used for being locked with the coupling component, such as a camera fixing support assembly 6, so that a camera body is mounted on the framework 1 through the coupling component, thereby greatly increasing connecting rigidity of the camera to the framework 1, and increasing connecting rigidity between the camera and the lens as will be explained below, and effectively preventing a connecting mount of the camera from being damaged; and one or more mounting holes 3 distributed in a side surface of the framework 1 and used for installation of coupling components. In an advantageous embodiment, a plurality of mounting holes 3 are arranged, and the mounting holes 3 are distributed along the length direction of the framework 1 in different distribution forms. In an advantageous embodiment, the mounting rails 2 are respectively arranged on the positions above and below the framework 1, and extend along the axial direction of the framework 1, and the mounting rail 2 has various structures. Advantageously, the mounting rail 2 is provided as a Picatinny Rail or a trapezoid rail.

The quick locking device is as described in another U.S. patent application Ser. No. 15/957,334 filed 19 Apr. 2018, the entire disclosures of which are hereby incorporated herein by reference.

Figure 1:
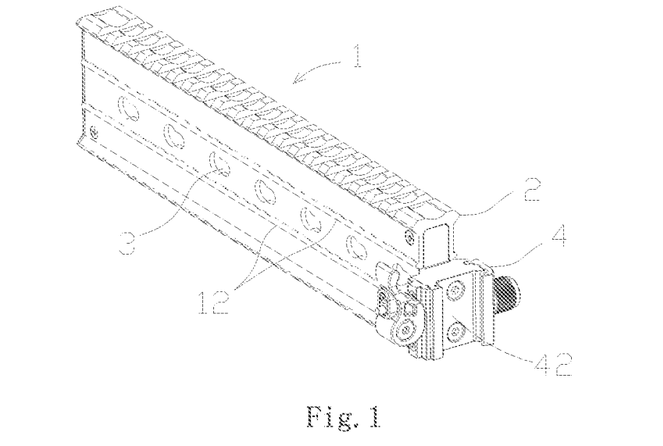
FIG. 1 is a stereoscopic structure diagram of a framework according to the present disclosure.
Figure 2:
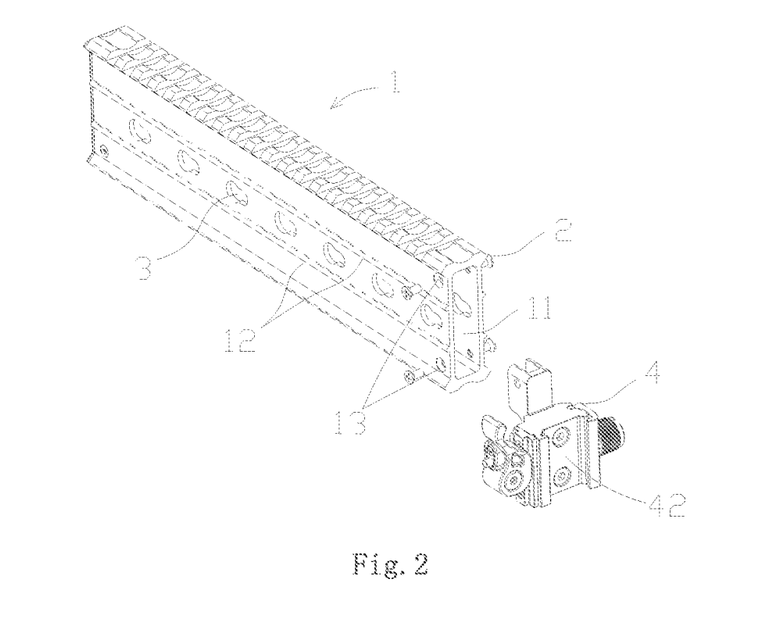
FIG. 2 is an explosive view of the framework according to the present disclosure.
Figure 3:
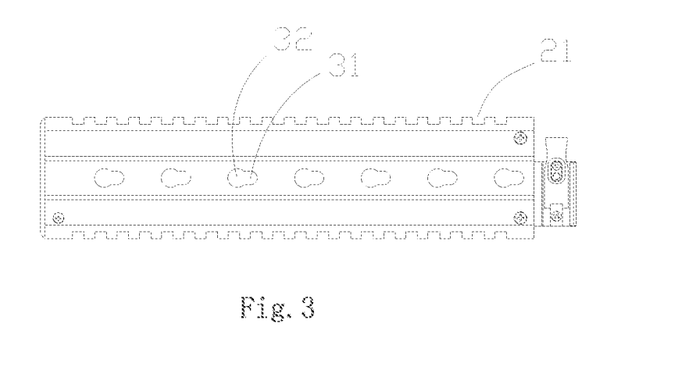
FIG. 3 is a front view of the framework according to the present disclosure.
Figure 4:
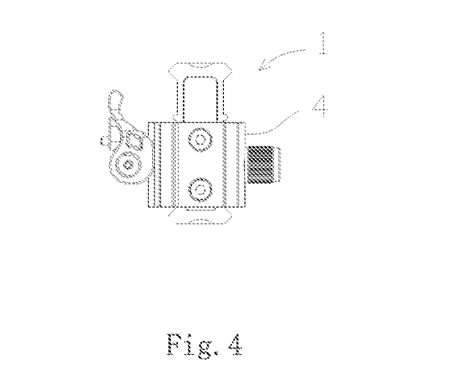
FIG. 4 is a right view of the framework according to the present disclosure.
Figure 5:
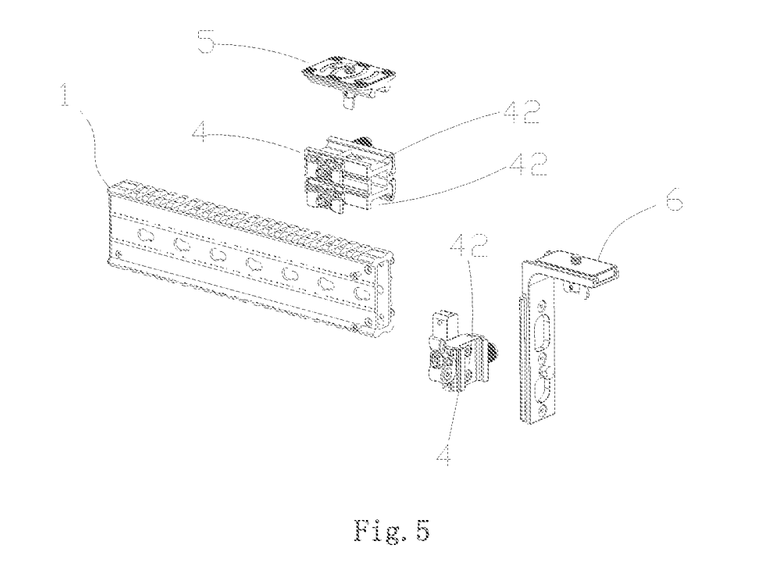
FIG. 5 is an explosive view of a first embodiment of mechanical connection application of the framework according to the present disclosure.
Figure 6:
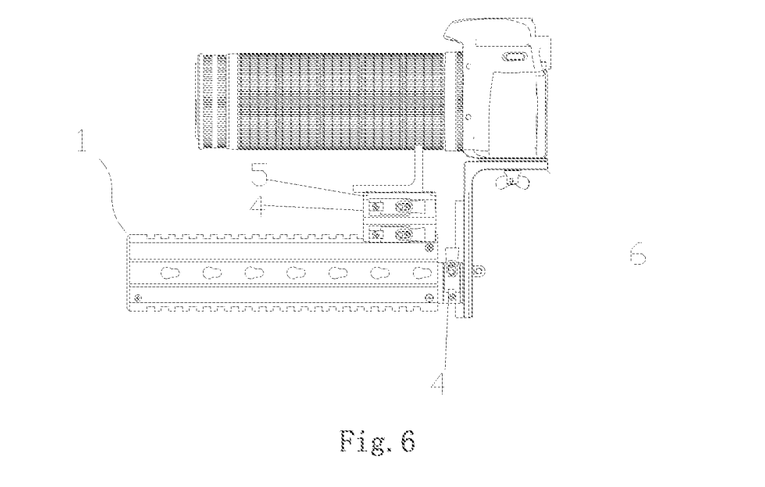
FIG. 6 is a diagram of assembly of the embodiment in FIG. 5.
Figure 7:
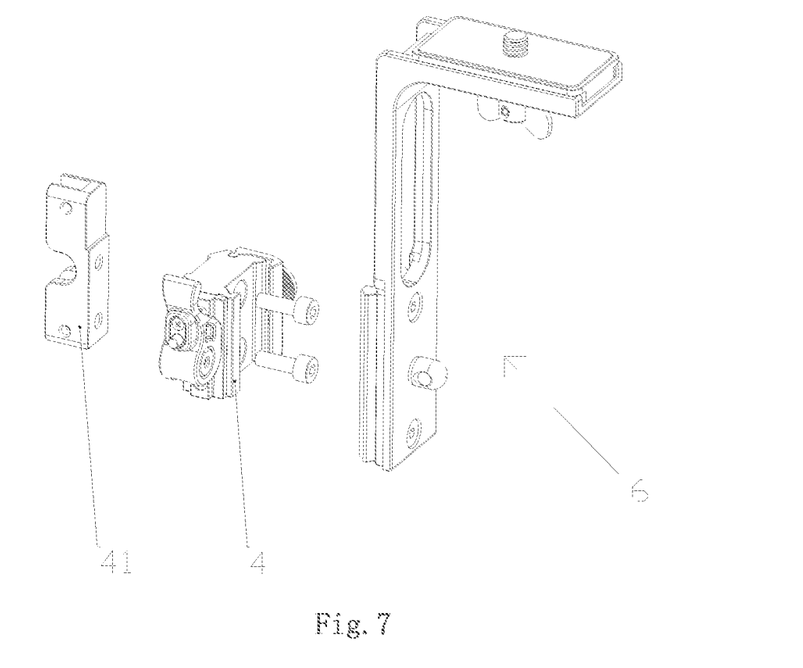
FIG. 7 is a structure diagram of a quick locking device; a connecting block and a camera fixing support assembly according to the present disclosure.
Figure 8:
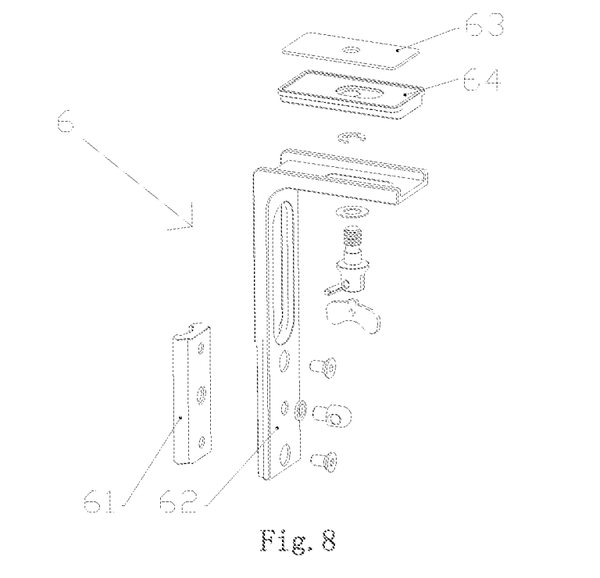
FIG. 8 is an explosive view of the camera fixing support assembly according to the present disclosure.
Figure 9:
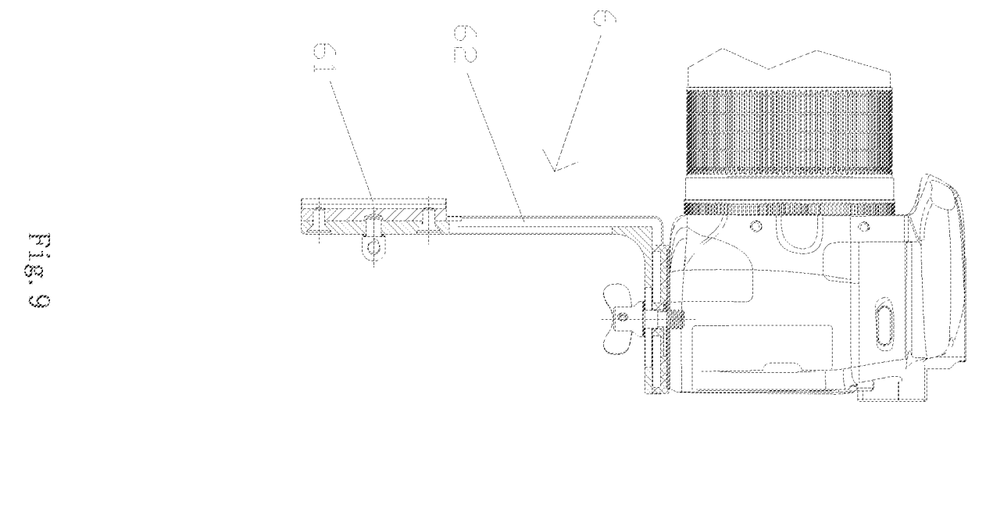
FIG. 9 is a side section view after the camera fixing support assembly is mounted on the camera according to the present disclosure.

With reference to FIGS. 5 to 6, the quick locking device 4 can be locked with the camera fixing support assembly 6 provided with the Picatinny Rail or the trapezoid rail. The camera fixing support assembly 6 is further described with reference to FIGS. 7 to 9. As shown in FIGS. 7 to 9, the camera fixing support assembly 6 is connected to the quick locking device 4 through a bolt, and a U-shaped connecting block 41 connects the quick locking device 4 to the framework 1 at the other side of the quick locking device 4, wherein the connecting block 41 can be referred to as a U-shaped connecting block, designed as a connecting block with a U-shaped slot at one side thereof. The camera fixing support assembly 6 includes an L-shaped support main body 62, an guide rail 61 of the camera fixing support assembly connected to the L-shaped support main body 62 through the bolt, a camera base rubber mat 63 and a rubber mat sliding plate 64, wherein the rubber mat sliding plate 64 can be a quick mounting plate, wherein the rubber mat sliding plate 64 and the L-shaped support main body 62 can slide and be fixed relative to each other. As shown in FIG. 6, a lens, such as telephoto lens, can be mounted, via its lens holder, the quick mounting plate 5 and the quick locking device 4, on the mounting rail 2. When mounting a camera on the camera fixing support assembly 6 via the sliding plate 64, to connect with the lens, the vertical and horizontal position of the camera relative to the framework 1 can be adjusted, by adjusting a displacement of the rubber mat sliding plate 64 (on which the camera is mounted) from the the L-shaped support main body 62, and/or a displacement of the L-shaped support main body 62 from the quick locking device 4 at the end of the framework 1, according to the relative distance of the camera from the lens, in order to meet an installation requirement, and to achieve a rigid connection between the camera and the lens.

Figure 10:
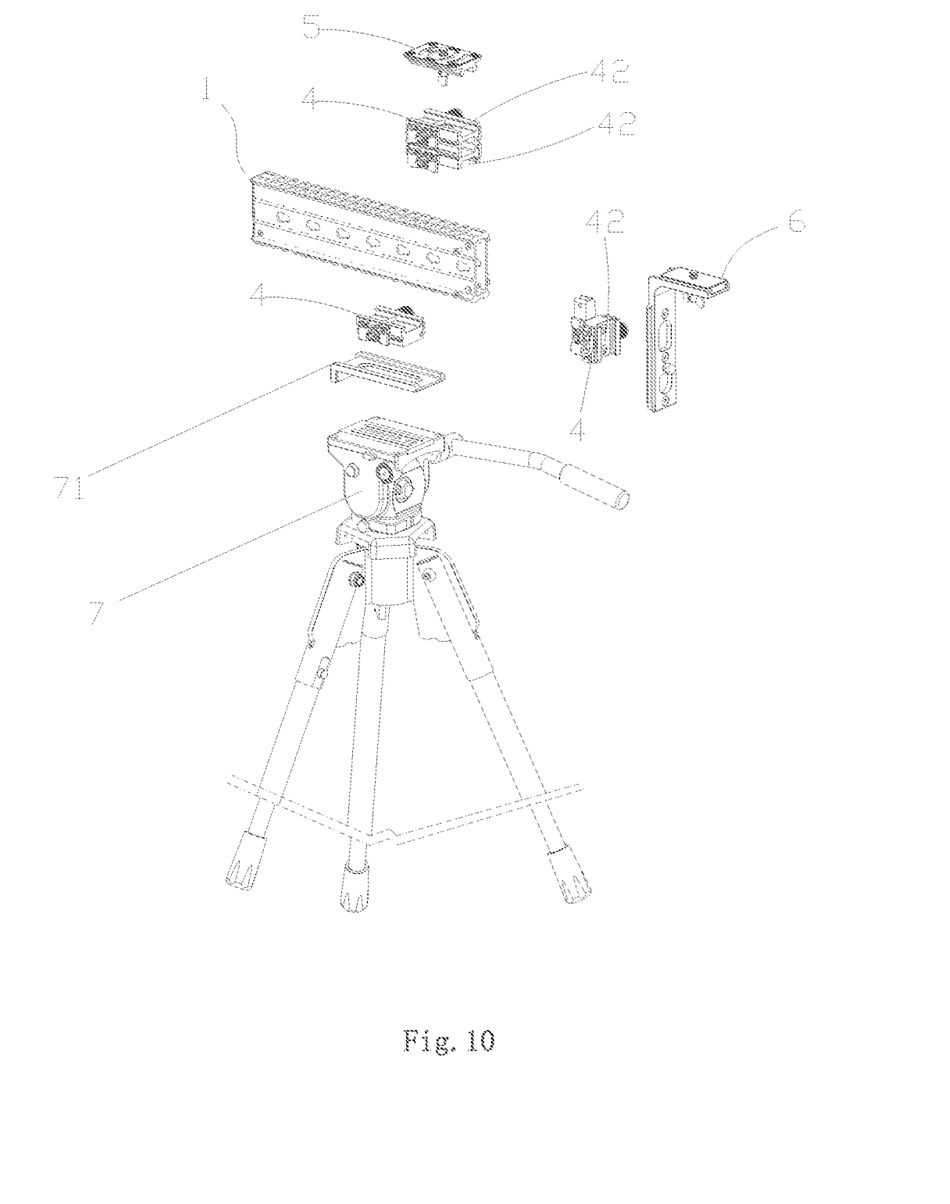
FIG. 10 is an explosive view of mechanical connection application of the framework applied to another embodiment according to the present disclosure.
Figure 11:
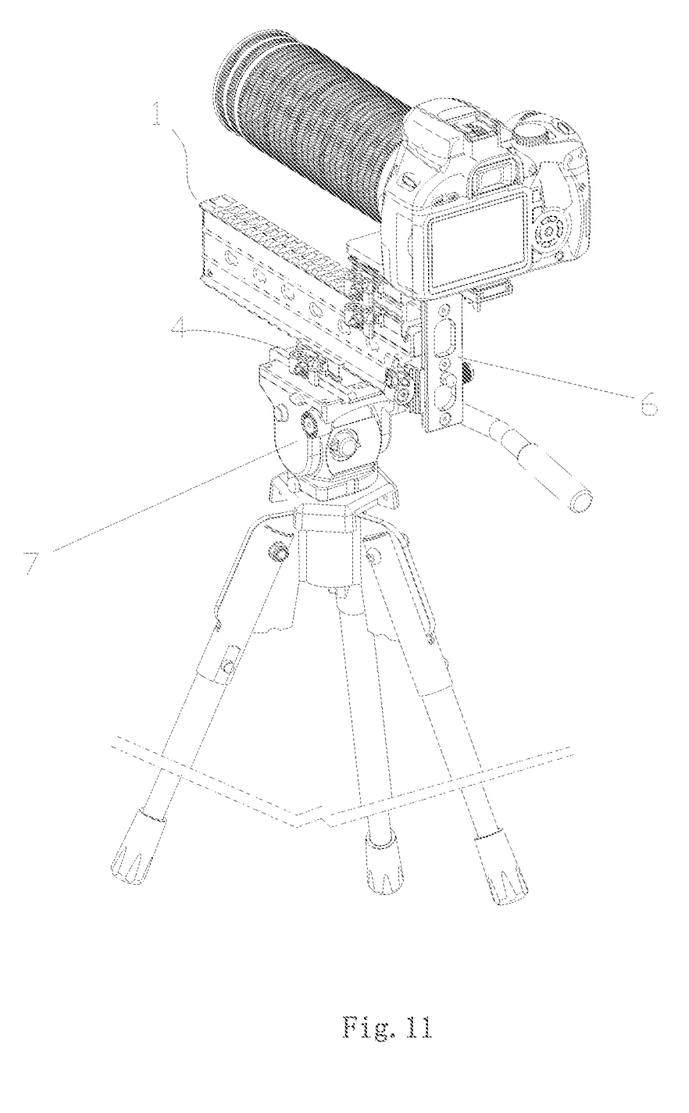
FIG. 11 is a diagram of assembly of the embodiment in FIG. 10.
Figure 12:
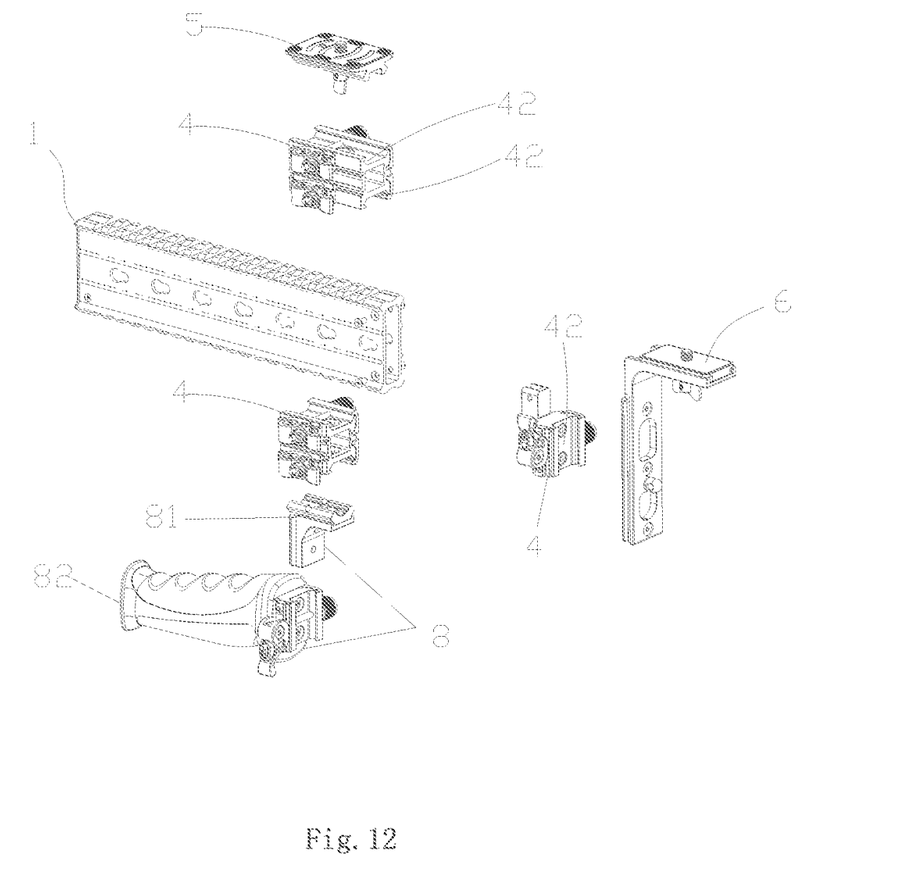
FIG. 12 is an explosive view of another embodiment of mechanical connection application of the framework according to the present disclosure.
Figure 13:
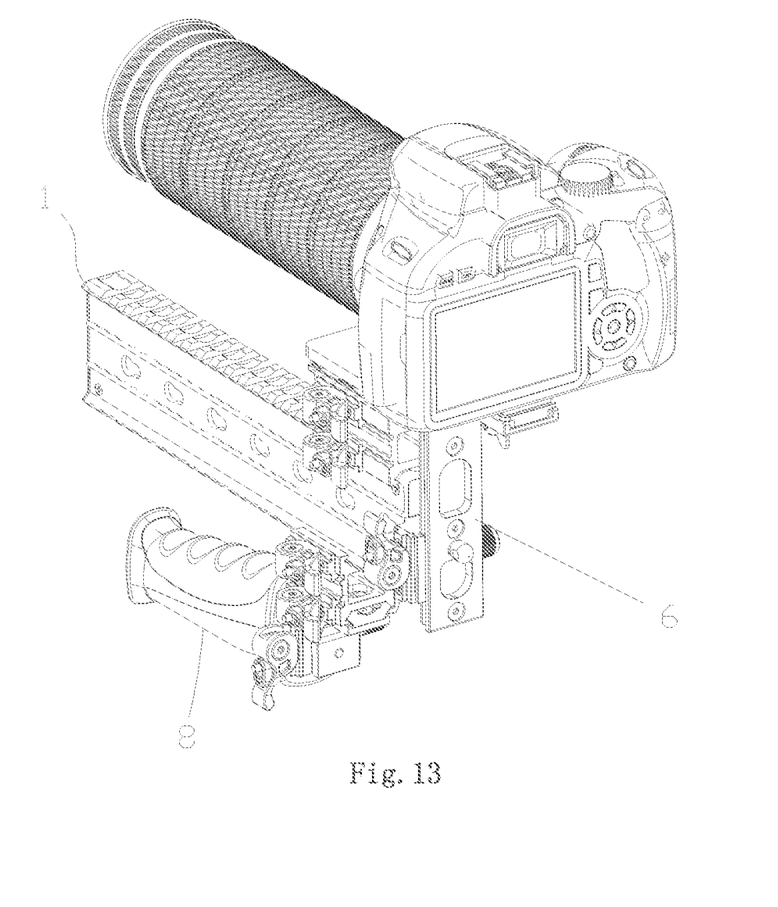
FIG. 13 is a diagram of assembly of the embodiment in FIG. 12.

In the embodiment, the coupling components of the camera, the lens and the assisted photographic equipment are connected to the framework 1 through the quick locking device 4, and the quick locking device 4 can realize quick mounting and disassembly of the coupling components of the camera, the lens and the assisted photographic equipment on the mounting rail 2. The quick locking device 4 includes a bidirectional quick locking device and an unidirectional quick locking device. With reference to FIGS. 5 to 6, specifically, an upper side of the bidirectional quick locking device is locked with the lens through the quick mounting plate 5, a lower side of the bidirectional quick locking device is directly locked with the mounting rail 2 above the framework 1, and the unidirectional quick locking device 4 is arranged at the end portion of the framework 1 and is locked with the camera fixing support assembly 6 provided with the Pictorianny rail or the trapezoid rail, so that the camera and the lens are firmly connected to the framework 1. With reference to FIGS. 10 to 11, on the basis of the embodiment above, the camera tripod assembly 7 can be selectively added, the camera tripod assembly 7 is connected to a bottom of the unidirectional quick locking device 4 through a positioning adapter 71, and then is locked with the Picaitinny rail or the trapezoid rail below the framework 1 through the unidirectional quick locking device 4, so that the photographic equipment can be disassembled and assembled quickly and moved conveniently. With reference to FIGS. 12 to 13, in another embodiment, the handling assembly 8 is selectively arranged on the Pictorianny rail or the trapezoid rail below the framework 1, the handling assembly is composed of a L-shaped mount 81 with Picatinny rail or trapezoid rail, and a handle 82 provided with the unidirectional quick locking device, which is connected to the framework 1 through the bidirectional quick locking device 4. This will undoubtedly bring great convenience to the user in most outdoor dynamic photography that cannot be performed using a tripod. Meanwhile, a smooth design of the handle enables the user to obtain a good hand-held shooting experience when photographing and framing, such as flexibly adjusting the viewing angle by rotating the handle.

Figure 14:
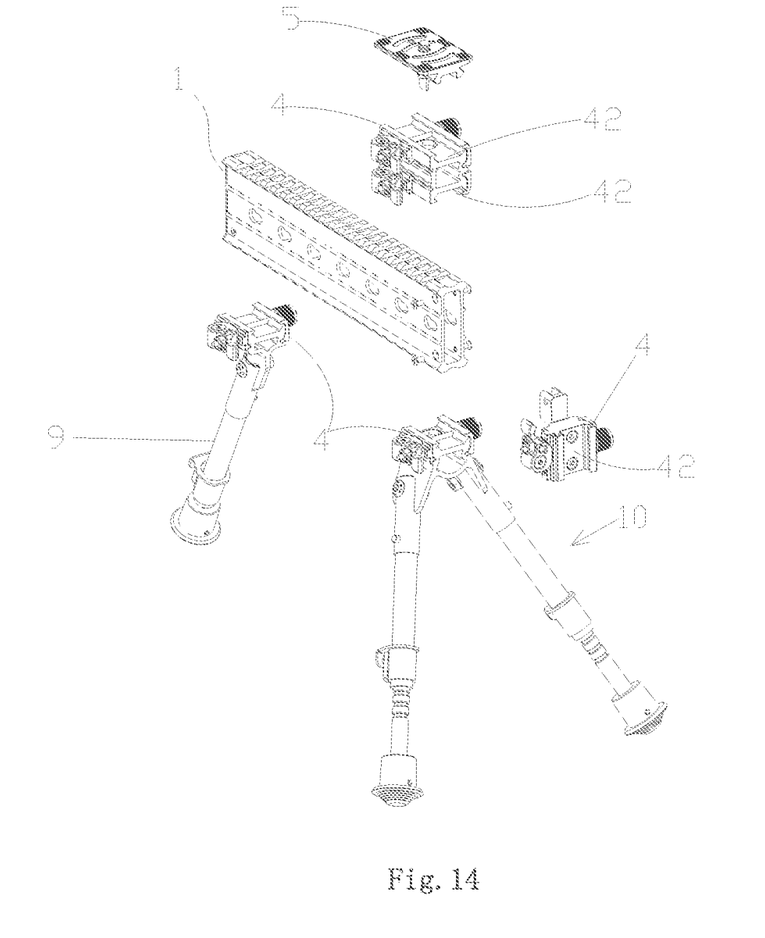
FIG. 14 is an explosive view of another embodiment of mechanical connection application of the framework according to the present disclosure.
Figure 15:
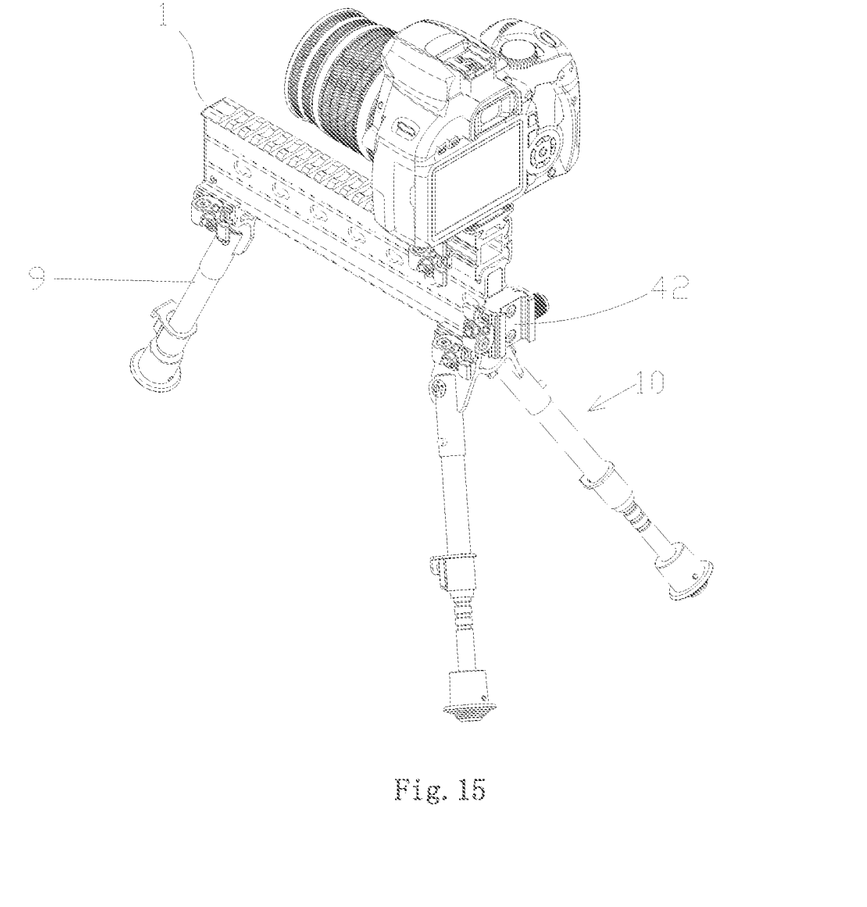
FIG. 15 is a diagram of assembly of the embodiment in FIG. 14.

With reference to FIGS. 14 to 15, in an advantageous embodiment, the mounting rails such as the Pictorianny rail or the trapezoid rail are respectively arranged on the positions above and below the framework 1 for installation of coupling components. The camera with a macro lens is locked into the mounting rail above the framework 1 through the quick mounting plate 5 and the bidirectional quick locking device 4. By locking and releasing the the bidirectional quick locking device 4 on the mounting rail, the horizental position of the camera along the axis of the framework 1 can be adjusted, according to requirements on focusing, parameter adjustment and shutter operation. The front and rear positions of the mounting rail below the framework 1 are respectively locked with rotatably locked support leg assemblies 9 and 10 with adjustable axial length through the unidirectional quick locking device 4. The embodiment can be used as a macro ecological photographic support, has the advantages of good stability, quick adjustment, convenient use and the like, can reduce the focusing difficulty of the user and improve the defocusing phenomenon, and improves the quality of the photographic image.

Figure 16:
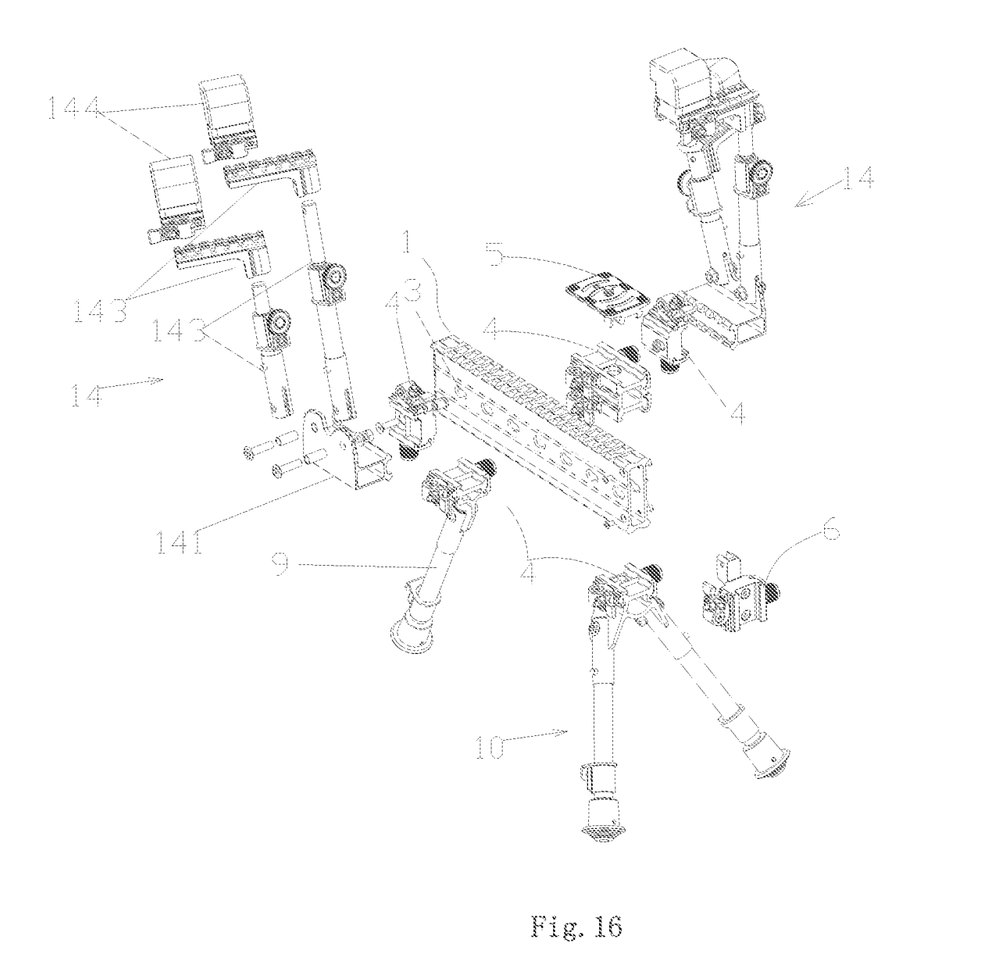
FIG. 16 is an explosive view of another embodiment of mechanical connection application of the framework according to the present disclosure.
Figure 17:
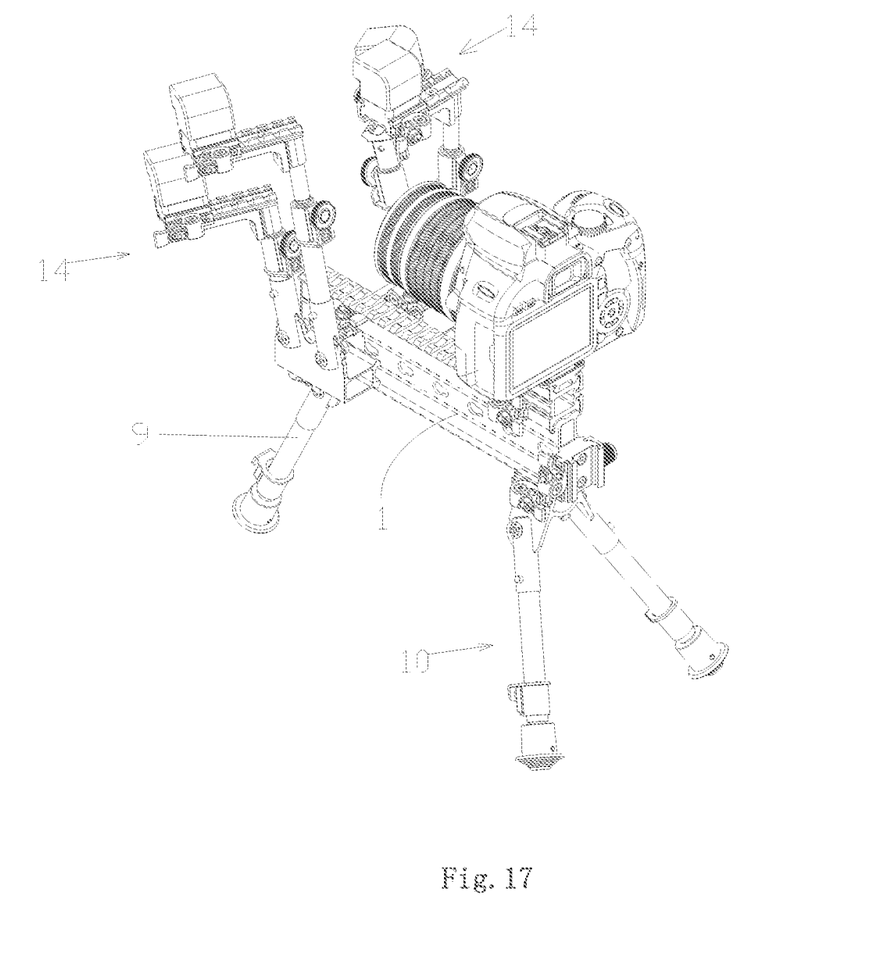
FIG. 17 is a diagram of assembly of the embodiment in FIG. 16.

With reference to FIGS. 16 to 17, on the macro ecological photographic support described in the embodiment above, the unidirectional quick locking device 4 and a light source mounting support arm assembly 14 locked with the unidirectional quick locking device 4 are selectively arranged in the mounting hole 3 in the side surface of the framework 1, wherein the unidirectional quick locking device 4 is engaged with the mounting hole 3 arranged in the side surface of the framework 1 through the cooperation of a bolt and a shoulder nut. The light source mounting support arm assembly 14 includes a side mount 141 with rail, a rotatably locked support arm 142 with axially adjustable length, a transverse rail assembly 143 and a light source base 144, wherein the light source mounting support arm assembly 14 is locked with the unidirectional quick locking device 4 through the side mount 141 with rail, the support arm 142 can swing in a clockwise or counterclockwise direction and is locked on the side mount 141 with rail, an end portion of the support arm 142 is provided with the transverse rail assembly 143, which is provided with the Pictorianny rail or the trapezoid rail, the transverse rail assembly 143 can rotate around an axis, the light source base 144 is provided with the unidirectional quick locking device, which is locked with the Pictorianny rail or the trapezoid rail on the transverse rail assembly 143, and can be adjusted along an axial direction of the rail. One or more groups of light source mounting support arm assemblies can be mounted on the side surface of the framework according to the lighting requirement when photographing, so that the lighting effect of the photographed object is optimized, thereby shooting a photographic work full of art and shocking vision.

In order to facilitate quick positioning of the quick locking device 4 when the quick locking device 4 is mounted on the mounting rail 2, one or more positioning slots 21 are advantageously arranged on the mounting rail 2, and the positioning slot 21 is groove-shaped, and extends along the width direction of the framework 1 and passes through the framework (or refer to as acrossing the width direction of the framework). During assembly, a pulling rod of the quick locking device 4 is just placed in the positioning slot 21, so that the quick locking device 4 is limited by the positioning slot 21 in the length direction of the framework 1. One positioning slot 21 can be arranged, or a plurality positioning slots 21 are arranged and distributed along the length direction of the framework 1, which is conductive to arbitrarily selecting a mounting position on the mounting rail 2 for the quick locking device.

In the embodiment, an opposite side surface of the framework 1 is provided with the mounting hole 3. More specifically, a shape of the mounting hole 3 is advantageously set to be calabash-shaped, including a straight slot section 31 and a round hole section 32, one end of the straight slot section 31 is arranged into a semicircle, the other end is communicated with the round hole section 32, the round hole section 32 is used for a locking nut to pass through, and a width of the straight slot section 31 is less than an aperture of the round hole section 32 to catch a shoulder of the locking nut.

In order to reduce a weight of the framework and facilitate the mounting of coupling components in the mounting hole 3, the framework 1 is advantageously designed as a rectangular frame structure, an inner frame of the framework 1 is provided with a cavity 11 passing through along the length direction thereof, and the mounting hole 3 passes through the cavity 11. The cavity 11 reduces the weight of the framework on the premise of guaranteeing a use strength, and can be provided with the mounting hole 3 for installation of coupling components. In addition, one or more screw holes 13 are arranged at four corners of a side surface of the end portion of the framework 1 to mount different accessories.

In order to facilitate the quick mounting of coupling components into the mounting hole 3, the side surface of the framework 1 is advantageously provided with two positioning bump rails 12 up and down, a positioning slot is formed between the two positioning bump rails 12, and the mounting hole 3 is arranged between the two positioning bump rails 12. During assembly, the two positioning bump rails 12 up and down can enable the coupling component to be quickly positioned, thereby facilitating the nut to be positioned in the mounting hole 3, and improving the assembly efficiency. At the same time, the positioning bump rail 12 also limits the upper and lower positions of the coupling component to ensure reliable mounting connection of the coupling component in the mounting hole 3.

The design of the framework described in the present disclosure abandons the camera tripod structure in the traditional technology, provides a good mounting platform for the user that reflects the individuality and improves the photographic quality, and facilitates the user to mount various module assemblies in a small space at the same time, so as to realize rapid disassembly and assembly, and free adjustment, and meet the DIY requirement of free assembly.

Although the preferred embodiments of the present disclosure have been specifically described above by the specific structure or dimensional data, the present disclosure is not limited thereto. Those skilled in the art can make various equivalent variations or replacements without departing from the essence of the present disclosure, and these equivalent variations or replacements shall fall into the scope defined by the appended claims of the present application.

Numerical data have been presented herein in a range format. It is to be understood that this range format is used merely for convenience and brevity and should be interpreted flexibly to include not only the numerical values explicitly recited as the limits of the range, but also to include all the individual numerical values or sub-ranges encompassed within that range as if each numerical value and sub-range is explicitly recited. While examples have been described in detail, those familiar with the art to which this disclosure relates will recognize various alternative designs and examples for practicing the disclosed method within the scope of the appended claims.

While the invention has been described in connection with one or more embodiments, it should be understood that the invention is not limited to those embodiments. On the contrary, the invention covers all alternatives, modifications and equivalents as may be included within the scope of the appended claims.

LIST OF NUMERALS OF DRAWINGS

1 framework, 11 cavity, 12 positioning bump rail, and 13 screw hole;

2 mounting rail, and 21 positioning slot;

3 mounting hole, 31 straight slot section, and 32 round hole section;

4 quick locking device, and 41 connecting block;

5 quick mounting plate or quick shoe plate or quick loading plate;

6 camera fixing support assembly; 61 Guide rail of the camera fixing support assembly, 62 L-shaped support main body, 63 camera base rubber at; and 64 rubber mat sliding plate;

7 camera tripod assembly, and 71 positioning adapter;

8 handling assembly, 81 L-shaped mount with Picatinny rail or trapezoid rail;

9 front support leg assembly;

10 rear support leg assembly; and

14 light source mounting support arm assembly, 141 side mount with rail; 142 rotatably locked support arm, 143 transverse rail assembly, and 144 light source base.

What is claimed is:

1. A framework for installation of a coupling component, comprising:

a top mounting rail defined on a top position of the framework and a bottom mounting rail defined on a bottom position of the framework used for installation of the coupling component, wherein the top mounting rail and the bottom mounting rail extend along a length direction of the framework;

a locking device positioned at an end portion of the framework;

one or more mounting holes positioned on a side surface of the framework and used for installation of the coupling component; and one or more screw holes positioned at four corners of the side surface of the framework to mount different accessories;

wherein a cross-section of the framework comprises a substantially rectangular profile, an inner frame of the framework is provided with a cavity passing through along the length direction thereof, and the one or more mounting holes pass through the cavity, and wherein the locking device is configured to lock the coupling component to the framework; wherein the locking device is provided with a clamping groove, configured to receive and clamp a Picatinny rail or a trapezoid rail provided on the coupling component, in order to lock the coupling component to the framework.

2. The framework for installation of the coupling component according to claim 1, wherein:

the top mounting rail and the bottom mounting rail extend along an axial direction of the framework.

3. The framework for installation of the coupling component according to claim 1, wherein:

the top mounting rail comprises an associated Picatinny rail or an associated trapezoid rail.

4. The framework for installation of the coupling component according to claim 2, wherein:
a surface of the top mounting rail and the bottom mounting rail is flat, or an upper surface thereof is provided with at least one positioning slot, the at least one positioning slot comprises a groove, and extends along a width direction of the framework and passes through the framework, and is distributed along the length direction of the framework.

5. The framework for installation of the coupling component according to claim 1, wherein:
the framework comprises two or more mounting holes distributed along the length direction of the framework.

6. The framework for installation of the coupling component according to claim 1, wherein:
opposite sides of the framework are both provided with the one or more mounting holes.

7. The framework for installation of the coupling component according to claim 1, wherein:
the cavity is provided with the one or more mounting holes for installation of the coupling component.

8. The framework for installation of the coupling component according to claim 1, wherein the framework comprises another locking device provided on the top mounting rail or the bottom mounting rail of the framework, configured to lock another coupling component to the framework.

9. The framework for installation of the coupling component according to claim 1, wherein the side surface of the framework is configured to be flat.

10. The framework for installation of the coupling component according to claim 1, wherein the coupling component comprises a camera fixing support assembly.

11. The framework for installation of the coupling component according to claim 1, wherein the coupling component comprise a quick mounting plate or a support.

12. The framework for installation of the coupling component according to claim 1, wherein:
the bottom mounting rail comprises an associated Picatinny rail or an associated trapezoid.

13. A framework for installation of a coupling component, comprising:
a top mounting rail defined on a top position of the framework and a bottom mounting rail defined on a bottom position of the framework used for installation of the coupling component, wherein the top mounting rail and the bottom mounting rail extend along a length direction of the framework;
a locking device positioned at an end portion of the framework; and
one or more mounting holes arranged on a side surface of the framework and used for installation of the coupling component;
wherein a cross-section of the framework comprises a substantially rectangular profile, an inner frame of the framework is provided with a cavity passing through along the length direction thereof, and the one or more mounting holes pass through the cavity, and
wherein the one or more mounting holes are calabash-shaped or gourd-shaped, comprising:
a round hole section used for a locking nut to pass through; and
a straight slot section with one end configured as a semicircle, and another end communicated with the round hole section, wherein a width of the straight slot section is less than an aperture of the round hole section to catch a shoulder of the locking nut.

14. A framework for installation of a coupling component, comprising:
a top mounting rail defined on a top position of the framework and a bottom mounting rail defined on a bottom position of the framework used for installation of the coupling component, wherein the top mounting rail and the bottom mounting rail extend along a length direction of the framework;
a locking device positioned at an end portion of the framework;
one or more mounting holes positioned on a side surface of the framework and used for installation of the coupling components;
wherein a cross-section of the framework comprises a substantially rectangular profile, an inner frame of the framework is provided with a cavity passing through along the length direction thereof, and the one or more mounting holes pass through the cavity, and
wherein the side surface of the framework is provided with two positioning bump rails, including an upper positioning bump rail and a lower positioning bump rail, a positioning slot is formed between the two positioning bump rails, and the one or more mounting holes are positioned in the positioning slot.

* * * * *